US007661835B2

(12) United States Patent
Chou et al.

(10) Patent No.: US 7,661,835 B2
(45) Date of Patent: *Feb. 16, 2010

(54) DIRECT TYPE BACKLIGHT

(75) Inventors: Shen-Hong Chou, Toufen Township, Miaoli County (TW); Hui-Kai Chou, Taipei (TW)

(73) Assignee: AU Optronics Corp., Hsinchu (TW)

( * ) Notice: Subject to any disclaimer, the term of this patent is extended or adjusted under 35 U.S.C. 154(b) by 148 days.

This patent is subject to a terminal disclaimer.

(21) Appl. No.: 11/263,427

(22) Filed: Oct. 31, 2005

(65) Prior Publication Data

US 2006/0290620 A1  Dec. 28, 2006

(30) Foreign Application Priority Data

Jun. 27, 2005  (TW) ............................... 94121465 A

(51) Int. Cl.
*G09F 13/04* (2006.01)
*F21S 4/00* (2006.01)
*F21V 7/04* (2006.01)
*F21V 21/00* (2006.01)
*G02F 1/1335* (2006.01)

(52) U.S. Cl. ...................... 362/97.3; 362/225; 362/612; 362/249.02; 362/249.06; 362/249.13; 349/63

(58) Field of Classification Search .................. 362/97, 362/97.1–97.4, 612, 252, 33, 225, 613, 227, 362/249, 249.06, 249.13, 249.14, 240, 800, 362/249.02; 257/88; 349/61, 63; 313/500
See application file for complete search history.

(56) References Cited

U.S. PATENT DOCUMENTS

| | | | | |
|---|---|---|---|---|
| 5,301,090 A | * | 4/1994 | Hed | 362/558 |
| 5,691,760 A | * | 11/1997 | Hosier et al. | 347/238 |
| 6,007,209 A | * | 12/1999 | Pelka | 362/30 |
| 6,019,493 A | * | 2/2000 | Kuo et al. | 362/335 |
| 6,856,087 B2 | * | 2/2005 | Lin et al. | 313/500 |
| 7,159,999 B2 | * | 1/2007 | Yoo et al. | 362/249 |
| 7,380,958 B2 | * | 6/2008 | Jeong | 362/225 |
| 7,452,101 B2 | * | 11/2008 | Lan et al. | 362/225 |
| 2002/0159002 A1 | | 10/2002 | Chang | |
| 2004/0056777 A1 | * | 3/2004 | Blumel | 340/908 |
| 2006/0002107 A1 | * | 1/2006 | Jeong | 362/225 |
| 2006/0056201 A1 | * | 3/2006 | Chang et al. | 362/631 |
| 2006/0087827 A1 | * | 4/2006 | Jung et al. | 362/29 |
| 2006/0087838 A1 | * | 4/2006 | Grajcar | 362/227 |
| 2006/0087866 A1 | * | 4/2006 | Ng et al. | 362/612 |
| 2006/0092346 A1 | * | 5/2006 | Moon et al. | 349/61 |
| 2006/0164840 A1 | * | 7/2006 | Song et al. | 362/341 |
| 2006/0227545 A1 | * | 10/2006 | Mok et al. | 362/227 |
| 2007/0035946 A1 | * | 2/2007 | Ota et al. | 362/225 |
| 2007/0076142 A1 | * | 4/2007 | Ohshima et al. | 349/70 |

* cited by examiner

*Primary Examiner*—Jacob Y Choi
*Assistant Examiner*—David J Makiya
(74) *Attorney, Agent, or Firm*—Thomas, Kayden, Horstemeyer & Risley

(57) ABSTRACT

A direct type backlight has a plate and a plurality of light emitting diode (LED) rows. The LED rows are disposed on the plate, and every two adjacent LED rows have a row gap positioned therebetween. The one of these gaps, which is nearest to the center of the direct type backlight, is a minimum gap.

16 Claims, 6 Drawing Sheets

DIRECT TYPE BACKLIGHT

RELATED APPLICATIONS

The present application is based on, and claims priority from, Taiwan Application Serial Number 94121465, filed Jun. 27, 2005, the disclosure of which is hereby incorporated by reference herein in its entirety.

BACKGROUND

1. Field of Invention

The present invention relates to a direct type backlight. More particularly, the present invention relates to a distribution of light emitting diodes (LEDs) for the backlight.

2. Description of Related Art

The principle for operating a backlight module is to direct the light emitted from a backlight as a planar light source via a light guide plate, thereby assuring the uniformity of lightness. A backlight commonly used in the backlight module can be such as a cold cathode fluorescent lamp (CCFL) and light emitting diodes (LEDs), etc. Although the CCFL is the main trend currently, yet the demands for using the LEDs have been increasing daily. In comparison with the CCFL, the LEDs have the advantages of small size, long operation life, low driving voltage, low power consumption and excellent shock resistance, etc.

FIG. 1 is a schematic diagram showing a conventional direct type backlight using light emitting diodes, and the direct type backlight includes a plate 102 and several LED rows 104 disposed on the plate 102. Each of the LED rows 104 comprises several light emitting diodes 114, and row gaps $a_1$, $a_2$, $a_3$ and $a_4$ between two of the LED rows 104 are all the same, i.e. $a_1=a_2=a_3=a_4$.

The aforementioned light emitting diodes are evenly spaced on the plate according to a conventional distribution, i.e. the row gaps between any two adjacent LED rows 104 are all the same. However, this conventional distribution with equal gaps makes the central lightness of LED fail to achieve optimum application. Since user's visual sensation is mainly dependent on the central position of a panel, the lightness distribution obtained by this conventional distribution cannot optimize the user's visual sensation.

SUMMARY

Hence, the present invention is to provide a direct type backlight for achieving better lightness distribution by using a better LED distribution.

In accordance with a preferred embodiment, the direct type backlight comprises a plate and a plurality of LED rows. The LED rows are disposed on the plate, and there is a row gap between every two adjacent LED rows. Meanwhile, one of the row gaps nearest to a center of the direct type backlight is minimum in size.

In accordance with another preferred embodiment, the direct type backlight comprises a plate and a plurality of LED rows. The LED rows are disposed on the plate, and there is a row gap between every two adjacent LED rows. Meanwhile, one of the row gaps nearest to a center of the direct type backlight is smaller than the other row gaps.

In accordance with still another preferred embodiment, the direct type backlight comprises a plate and a plurality of LED rows. The LED rows are disposed on the plate, and there is a row gap between every two adjacent LED rows. Meanwhile, the row gaps are increased sequentially from a center of the direct type backlight to the margins thereof.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
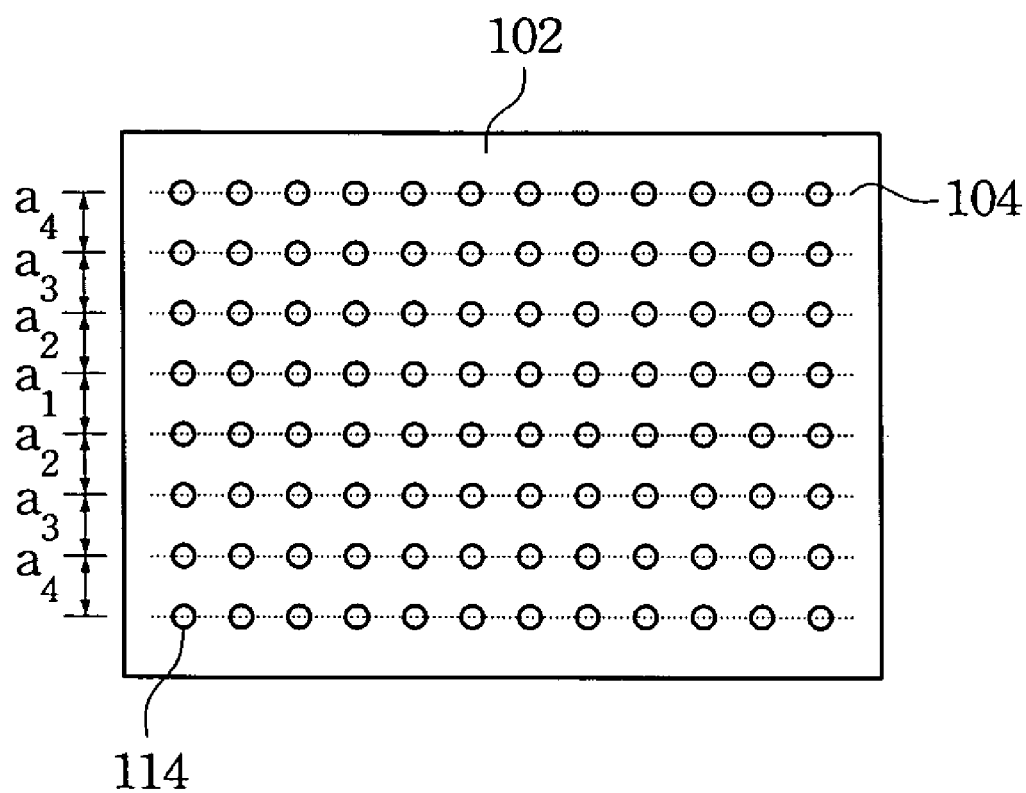
FIG. 1 is a schematic diagram showing a conventional direct type backlight using light emitting diodes.

Reference will now be made in detail to the preferred embodiments of the present invention, examples of which are illustrated in the accompanying drawings. Wherever possible, the same reference numbers are used in the drawings and the description to refer to the same or like parts.

The present invention changes the conventional distribution of LEDs in the backlight so as to enable a central position of the backlight to have the maximum relative lightness, thus making the central lightness of the LEDs achieve optimum application and also optimizing user's visual sensation.

Figure 2A:
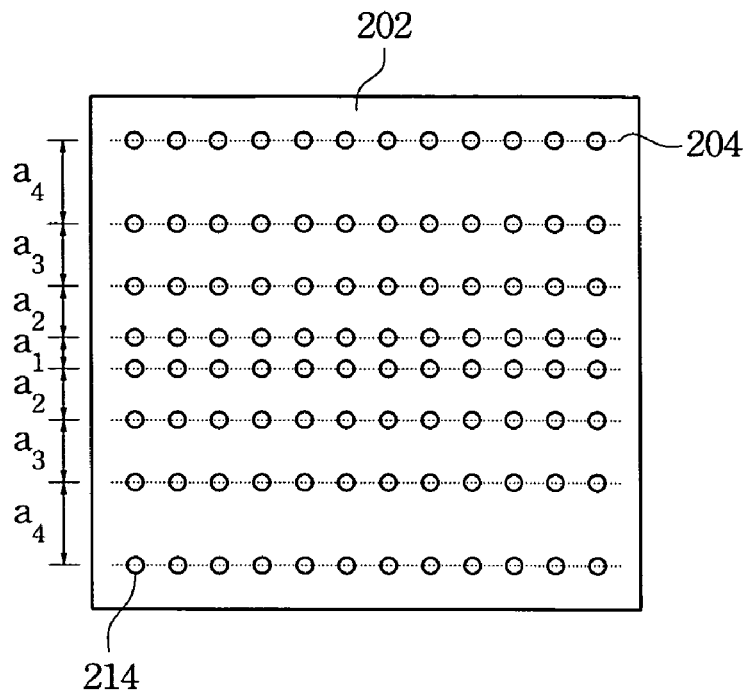
FIGS. 2A and 2B are schematic diagrams showing preferred embodiments of the present invention.
Figure 2B:
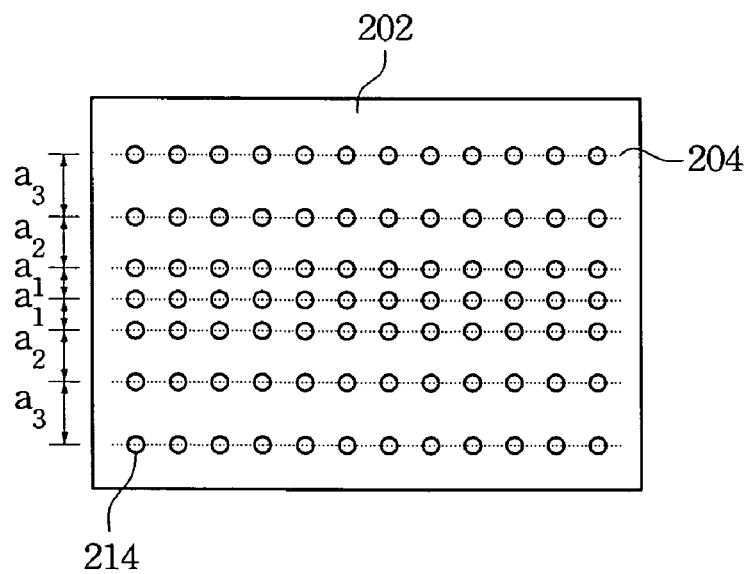

FIGS. 2A and 2B are schematic diagrams showing preferred embodiments of the present invention for explaining the case in which row gaps between every two adjacent LED rows are increased sequentially from a center of a direct type backlight to the margins thereof.

Such as shown in FIG. 2A, a direct type backlight 200a comprises a plate 202 and several LED rows 204. The LED rows 204 are disposed on the plate 202, and a row gap between every two adjacent LED rows 204 is $a_1$, $a_2$, $a_3$ or $a_4$, and the row gaps are increased sequentially from a center of the direct type backlight 200a to the margins thereof, i.e. $a_1<a_2<a_3<a_4$.

Such as shown in FIG. 2B, a direct type backlight 200b comprises a plate 202 and several LED rows 204. The LED rows 204 are disposed on the plate 202, and a row gap between every two adjacent LED rows 204 is $a_1$, $a_2$ or $a_3$, and the row gaps are increased sequentially from a center of the direct type backlight 200a to the margins thereof, i.e. $a_1<a_2<a_3$.

Moreover, each of the LED rows 204 comprises several LEDs 214, and gaps between every two adjacent LEDs 214 are equal in size. There are an even number of LED rows 204 shown in FIG. 2A, and thus the center of the direct type backlight 200a has only one narrowest row gap $a_1$. There are an odd number of LED rows 204 shown in FIG. 2B, and thus the position nearest to the center of the direct type backlight 200b may have two narrowest row gaps $a_1$.

Figure 3A:
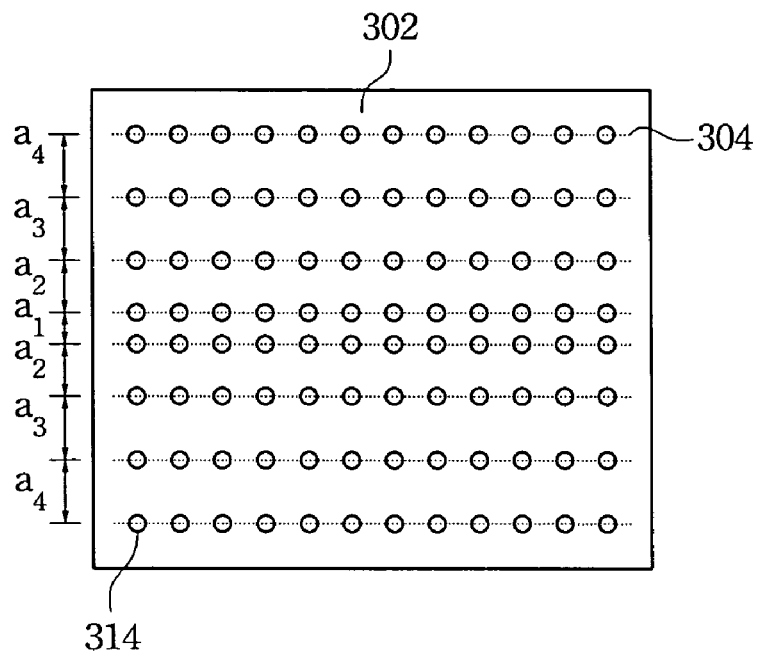
FIGS. 3A and 3B are schematic diagrams showing other preferred embodiments of the present invention.
Figure 3B:
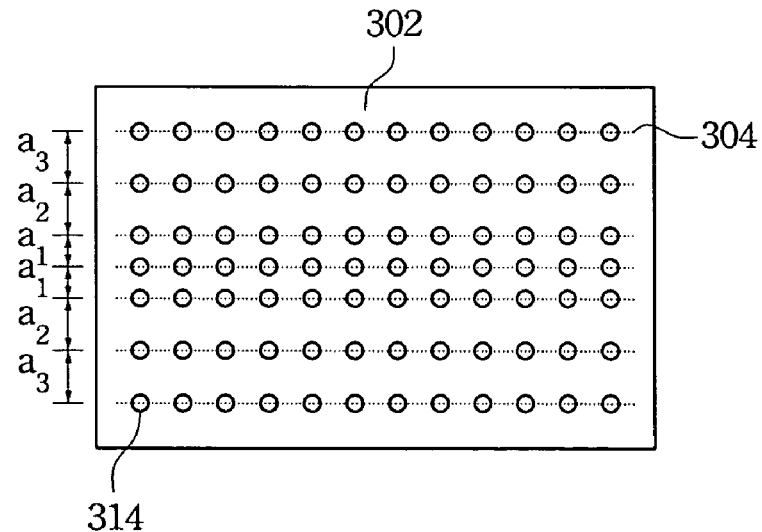

FIGS. 3A and 3B are schematic diagrams showing other preferred embodiments of the present invention for indicating that the central position of the direct type backlight has the narrowest row gap(s), and at least two row gaps at non-central positions thereof are equal in size.

Such as shown in FIG. 3A, a direct type backlight 300a comprises a plate 302 and several LED rows 304. The LED rows 304 are disposed on the plate 302, and a row gap between every two adjacent LED rows 304 is $a_1$, $a_2$, $a_3$ or $a_4$. The row gap $a_1$ at a center of the direct type backlight 300a is minimum in size, and the row gaps $a_3$ and $a_4$ at non-central positions thereof are equal in size, i.e. $a_1 < a_2 < a_3 = a_4$.

Such as shown in FIG. 3B, a direct type backlight 300b comprises a plate 302 and several LED rows 304. The LED rows 304 are disposed on the plate 302, and a row gap between every two adjacent LED rows 304 is $a_1$, $a_2$ or $a_3$. The row gaps $a_1$ nearest to a center of the direct type backlight 300b are minimum in size, and the row gaps $a_2$ and $a_3$ at non-central positions thereof are equal in size, i.e. $a_1 < a_2 = a_3$.

Moreover, each of the LED rows 304 comprises several LEDs 314, and gaps between every two adjacent LEDs 314 are equal in size. There are an even number of LED rows 304 shown in FIG. 3A, and thus a center of the direct type backlight 300a has only one narrowest row gap $a_1$. There are an odd number of LED rows 304 shown in FIG. 3B, and thus the position nearest to the center of the direct type backlight 300b may have two narrowest row gaps $a_1$.

Figure 4A:
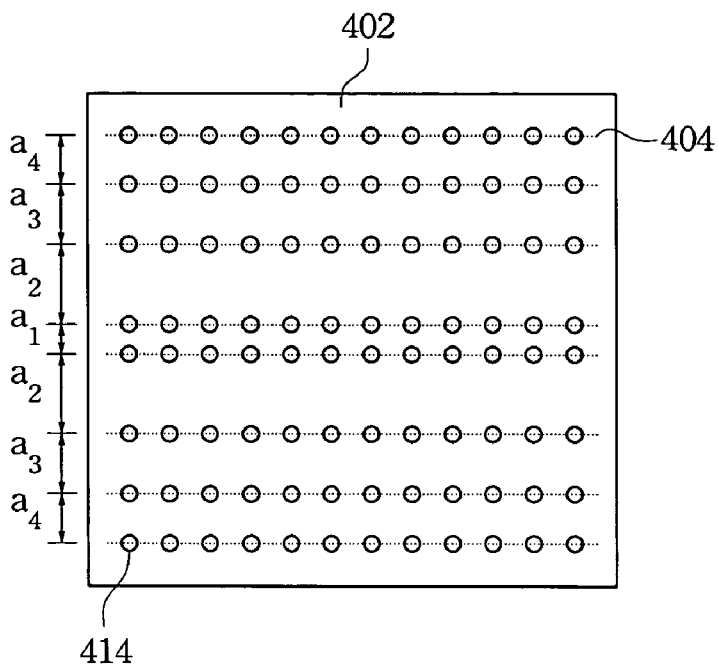
FIGS. 4A and 4B are schematic diagrams showing still other preferred embodiments of the present invention.
Figure 4B:
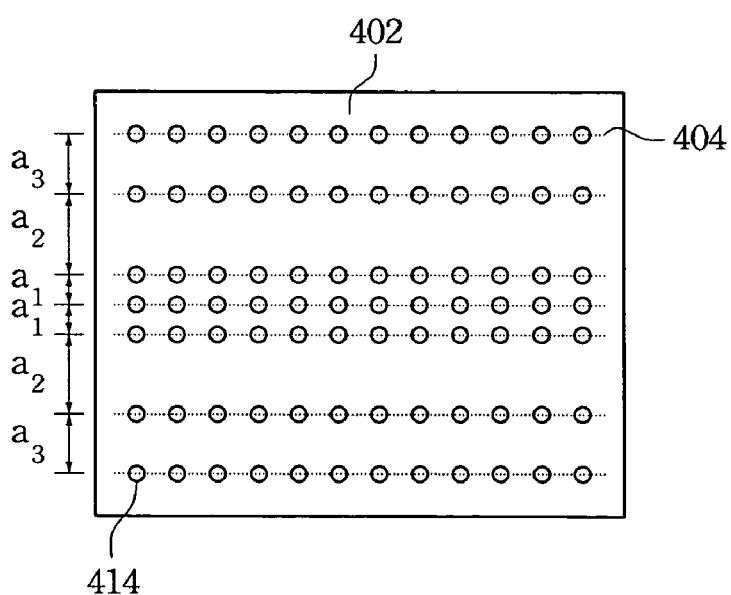

FIGS. 4A and 4B are schematic diagrams showing still other preferred embodiments of the present invention for indicating that the central position of the direct type backlight has the narrowest row gap(s), and the other row gaps at non-central positions thereof are not increased sequentially from the center of the direct type backlight to the margins thereof.

Such as shown in FIG. 4A, a direct type backlight 400a comprises a plate 402 and several LED rows 404. The LED rows 404 are disposed on the plate 402, and a row gap between every two adjacent LED rows 404 is $a_1$, $a_2$, $a_3$ or $a_4$. The row gap $a_1$ at a center of the direct type backlight 300a is minimum in size, and the other row gaps $a_2$, $a_3$ and $a_4$ at non-central positions the direct type backlight 400a are increased sequentially from the margins thereof to the center thereof, i.e. $a_1 < a_2$; $a_1 < a_3$; $a_1 < a_4$; and $a_2 > a_3 > a_4$.

Such as shown in FIG. 4B, a direct type backlight 400b comprises a plate 402 and several LED rows 404. The LED rows 404 are disposed on the plate 402, and a row gap between every two adjacent LED rows 404 is $a_1$, $a_2$ or $a_3$. The row gaps $a_1$ nearest to a center of the direct type backlight 400b is minimum in size, and the other row gaps $a_2$ and $a_3$ at non-central positions the direct type backlight 400b are increased sequentially from the margins thereof to the center thereof, i.e. $a_1 < a_2$; $a_1 < a_3$; and $a_2 > a_3 > a_4$.

Moreover, each of the LED rows 404 comprises several LEDs 414, and gaps between every two adjacent LEDs 414 are equal in size. There are an even number of LED rows 404 shown in FIG. 4A, and thus a center of the direct type backlight 400a has only one narrowest row gap $a_1$. There are an odd number of LED rows 404 shown in FIG. 4B, and thus the position nearest to the center of the direct type backlight 400b may have two narrowest row gaps $a_1$.

It can be known from the above preferred embodiments that: as long as the row gap at the center of the direct type backlight is smallest, various size relationships of the row gaps at other positions all are applicable within the inventive spirit of the present invention, and thus should be included in the scope of protection claimed in the present invention. Concretely speaking, as long a certain row gap located on a non-central position that is not nearest to the center of the direct type backlight is larger than the row gap nearest to the center thereof, another row gap located on the non-central position also can be equal to the smallest row gap in accordance with the design requirements.

In the above embodiments, the LEDs for each of the LED rows are spaced from each other at an equal distance. The following description is stated for further explaining various enablement changes of the gap between every two adjacent LEDs in one LED row.

Figure 5A:
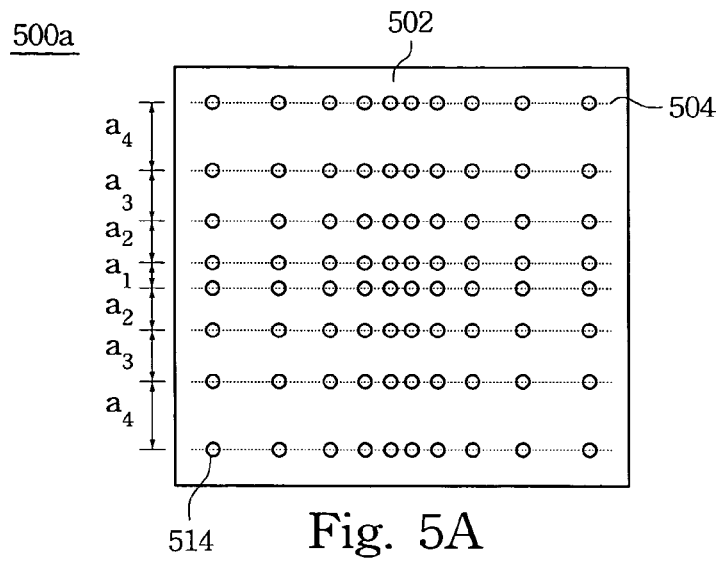
FIGS. 5A, 5B and 5C are schematic diagrams showing further other preferred embodiments of the present invention.
Figure 5B:
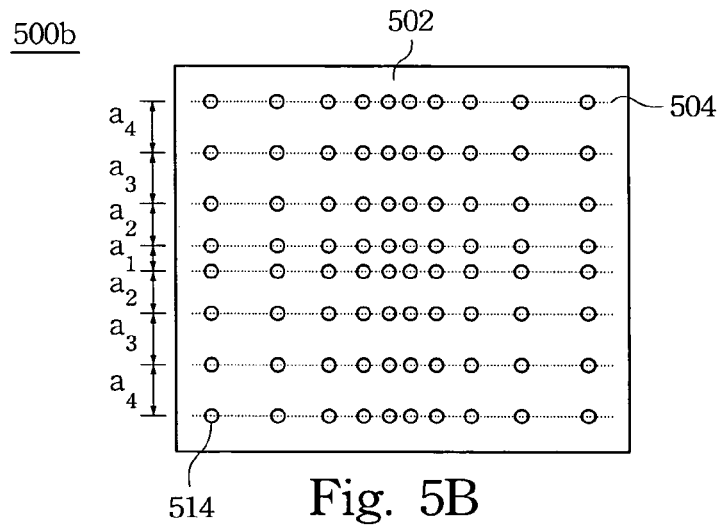
Figure 5C:
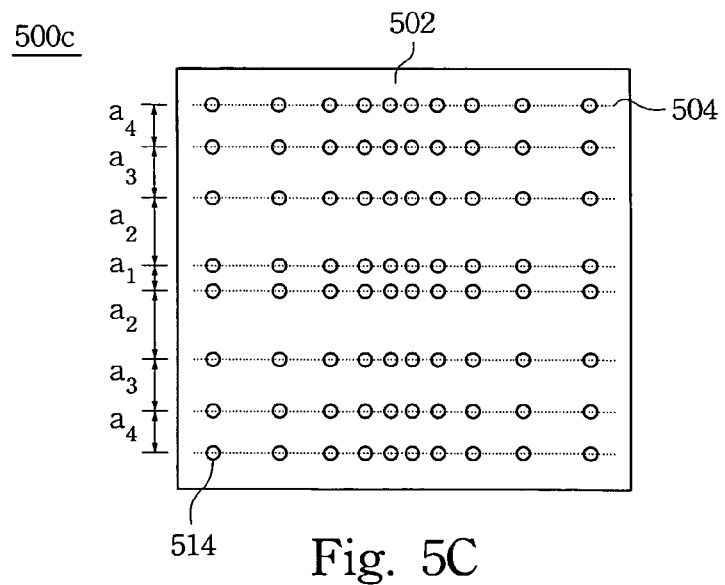

FIGS. 5A, 5B and 5C are schematic diagrams showing further other preferred embodiments of the present invention, corresponding to the embodiments shown in FIG. 2A, FIG. 3A and FIG. 4A respectively, wherein the gaps between the LEDs in one LED row are not the same in size. In a direct type backlight 500a shown in FIG. 5A, the size relationship of row gaps for LED rows 504 is $a_1 < a_2 < a_3 < a_4$. In a direct type backlight 500b shown in FIG. 5B, the size relationship of row gaps for LED rows 504 is $a_1 < a_2 < a_3 = a_4$. In a direct type backlight 500c shown in FIG. 5C, the size relationship of row gaps for LED rows 504 is $a_1 < a_2$; $a_1 < a_3$; $a_1 < a_4$; and $a_2 > a_3 > a_4$.

Each of the aforementioned LED rows 504 comprises several LEDs 514, and the gaps between the LEDs 514 are preferably increased in sequence from a center of a direct type backlight to the margins thereof, thereby enhancing the relative lightness at the central position of the backlight. Nonetheless, those who are skilled in the art should be able to learn that the gaps between the LEDs 514 can be adjusted in accordance with the actual needs, and are not limited to the gaps sequentially increasing from the center of the backlight to the margins thereof as described in the present embodiment.

Figure 6:
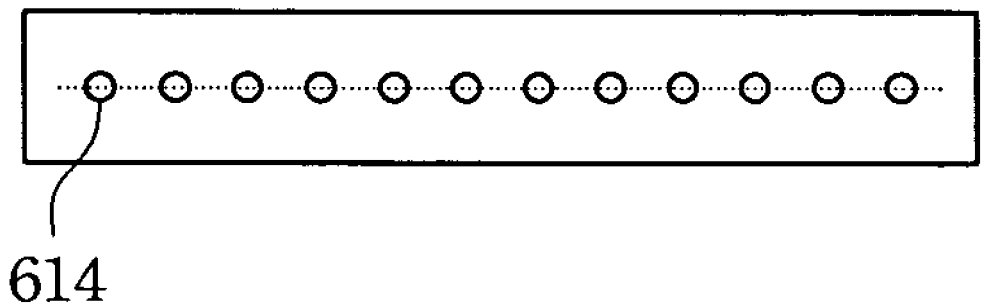
FIG. 6 is a schematic diagram showing a LED row according to a preferred embodiment of the present invention.

FIG. 6 is a schematic diagram showing a LED row according to a preferred embodiment of the present invention. The LED row used in the above preferred embodiments can be a LED light bar 604 on which several LEDs 614 are disposed. The LED light bar 604 has an advantage of briefly assembling, which can increase the manufacturing speed of backlight, thus promoting manufacturing efficiency.

To sum up, the LED distributions shown in the preferred embodiments can make a backlight achieve better lightness distribution, thus not only enabling the central lightness of LED to achieve optimum application, but also optimizing the user's visual sensation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A direct type backlight, comprising:
a plate; and
a plurality of light emitting diode (LED) rows disposed coplanarly on the plate and forming a gap between every two adjacent LED rows, thereby forming a plurality of row gaps among the LED rows, wherein each of the LED rows comprises at least three light emitting diodes, and the light emitting diodes in adjacent LED rows are aligned to form LED columns, wherein each light emitting diode is disposed in only one LED row and only one LED column, and one or two of the row gaps nearest to a center of the direct type backlight is the same as a first row gap smaller than all of the remaining row gaps away from the center.

2. The direct type backlight as claimed in claim 1, wherein the row gaps are increased from the center to a plurality of margins of the direct type backlight away from the center.

3. The direct type backlight as claimed in claim 1, wherein at least two row gaps not positioned nearest to the center are equal.

4. The direct type backlight as claimed in claim 1, wherein a diode gap is formed between every two adjacent light emitting diodes, and the diode gaps are increased from the center to margins of the direct type backlight.

5. The direct type backlight as claimed in claim 1, wherein a diode gap is formed between every two adjacent light emitting diodes, and the diode gaps are equal.

6. The direct type backlight as claimed in claim 1, wherein each of the LED rows is a LED light bar.

7. The direct type backlight as claimed in claim 1, wherein the number of the LED rows is odd and two row gaps nearest to the center of the direct type backlight are minimum as compared to other row gaps.

8. A direct type backlight, comprising:

a plate; and a plurality of light emitting diode (LED) rows disposed coplanarly on the plate and forming a gap between every two adjacent LED rows, thereby forming a plurality of row gaps among the LED rows, wherein each of the LED rows comprises at least three light emitting diodes, and the light emitting diodes in adjacent LED rows are aligned to form LED columns, wherein each light emitting diode is disposed in only one LED row and only one LED column, and the row gaps are increased monotonically from one or two row gaps nearest a center of the direct type backlight to a plurality of margins of the direct type backlight away from the center.

9. The direct type backlight as claimed in claim 8, wherein a diode gap is formed between every two adjacent light emitting diodes, and the diode gaps are increased from the center to margins of the direct type backlight.

10. The direct type backlight as claimed in claim 8, wherein a diode gap is formed between every two adjacent light emitting diodes, and the diode gaps are equal.

11. The direct type backlight as claimed in claim 8, wherein each of the LED rows is a LED light bar.

12. The direct type backlight as claimed in claim 8, wherein the number of the LED rows is odd and two row gaps nearest to the center of the direct type backlight are minimum as compared to other row gaps.

13. The direct type backlight as claimed in claim 1, wherein the number of the LED rows is even, and the row gaps comprises a second row gap adjoining the first row gap, a third row gap adjoining the second row gap, and a fourth row gap adjoining the third row gap, wherein the third row gap is greater than the second row gap in size; and the fourth row gap is equal to the third row gap in size.

14. The direct type backlight as claimed in claim 1, wherein the number of the LED rows is odd, and the row gaps comprises a second row gap adjoining the first row gap, and a third row gap adjoining the second row gap, wherein the third row gap is equal to the second row gap in size.

15. The direct type backlight as claimed in claim 1, wherein the number of the LED rows is even, and the row gaps comprises a second row gap adjoining the first row gap, a third row gap adjoining the second row gap, and a fourth row gap adjoining the third row gap, wherein the second row gap is greater than the third row gap in size; and the third row gap is greater than the fourth row gap in size.

16. The direct type backlight as claimed in claim 1, wherein the number of the LED rows is odd, and the row gaps comprises a second row gap adjoining the first row gap, and a third row gap adjoining the second row gap, wherein the second row gap is equal to the third row gap in size.

* * * * *